(12) United States Patent
Maglio et al.

(10) Patent No.: US 9,744,518 B2
(45) Date of Patent: Aug. 29, 2017

(54) METHOD OF REMOVING STRONTIUM CATIONS FROM A WATER STREAM USING AN AMORPHOUS TITANIUM SILICATE

(71) Applicant: BASF Corporation, Florham Park, NJ (US)

(72) Inventors: Alfonse Maglio, River Edge, NJ (US); David Durocher, Westland, MI (US)

(73) Assignee: BASF Corporation, Florham Park, NJ (US)

( * ) Notice: Subject to any disclaimer, the term of this patent is extended or adjusted under 35 U.S.C. 154(b) by 320 days.

(21) Appl. No.: 14/148,929

(22) Filed: Jan. 7, 2014

(65) Prior Publication Data

US 2014/0190892 A1    Jul. 10, 2014

Related U.S. Application Data

(60) Provisional application No. 61/750,557, filed on Jan. 9, 2013.

(51) Int. Cl.
| | |
|---|---|
| *C02F 1/28* | (2006.01) |
| *B01J 20/10* | (2006.01) |
| *B01J 39/14* | (2006.01) |
| *B01J 20/28* | (2006.01) |
| *G21F 9/10* | (2006.01) |
| *G21F 9/12* | (2006.01) |
| *C02F 101/00* | (2006.01) |
| *C02F 103/06* | (2006.01) |
| *C02F 103/08* | (2006.01) |

(52) U.S. Cl.
CPC ........... *B01J 20/10* (2013.01); *B01J 20/2803* (2013.01); *B01J 20/28004* (2013.01); *B01J 20/28047* (2013.01); *B01J 20/28061* (2013.01); *B01J 20/28071* (2013.01); *B01J 39/14* (2013.01); *C02F 1/281* (2013.01); *G21F 9/10* (2013.01); *G21F 9/12* (2013.01); *C02F 2101/006* (2013.01); *C02F 2103/06* (2013.01); *C02F 2103/08* (2013.01)

(58) Field of Classification Search
CPC  C02F 1/281; C02F 2101/006; C02F 2103/06; C02F 2103/08; G21F 9/12
USPC ......................................................... 210/682
See application file for complete search history.

(56) References Cited

U.S. PATENT DOCUMENTS

| | | |
|---|---|---|
| 4,764,284 A | 8/1988 | Jansen |
| 4,938,939 A | 7/1990 | Kuznicki |
| 5,053,139 A | 10/1991 | Dodwell et al. |
| 5,110,571 A | 5/1992 | Corcoran |
| 6,340,433 B1 | 1/2002 | Kuznicki |
| 8,147,696 B1 | 4/2012 | Pandya |
| 2003/0231994 A1 | 12/2003 | Sylvester |

FOREIGN PATENT DOCUMENTS

| | | |
|---|---|---|
| CN | 1387942 A | 1/2003 |
| WO | 2014/170835 A1 | 10/2014 |

OTHER PUBLICATIONS

Solbra et al, Cesium and Strontium Ion Exchange on the Framework Titanium Silicate (M2Ti2O3SiO4*nH2O (M=H, Na), Jan. 2001, Environmental Science and Technology, vol. 35, pp. 626-629.*
Moller, Selective Crystalline Inorganic Materials as Ion Exchangers in the Treatment of Nuclear Waste Solutions, Mar. 2002, Academic Dissertation at the University of Helsinki, pp. 1-66.*
Clearfield et al, Rates of Exchange of Cs+ and Sr2+ for Poorly Crystalline Sodium Titanium Silicate (CST) in Nuclear Waste Systems.*
Moller et al, Ion Exchange of 85Sr, 134Cs and 57Co in sodium titanosilicate and the effect of crystallinity on selectivity, Jan. 2002, Separation and Purification Technology, vol. 28, pp. 13-23.*
Goya et al, Adsorption of Trace Elements from Seawater by Chelex 100, Sep. 1967, U.S. Naval Radiological Defense Laboratory, USNRDL-TR-67-129, pp. 1-17.*
D.T. Hobbs, et al. "Strontium and Actinide Separations from High Level Nuclear Waste Solutions Using Monosodium Titanate 1. Stimulant Testing", Separation Science and Technology, 40: 3093-3111, 2005.
Hiromichi Yamazaki, et al. "Studies of the Hydrous Silicon(IV)-Titanium(IV) Oxide Ion Exchanger. I. A Method of Synthesis and Some Properties", The Chemical Society of Japan, 62, 1837-1843,1989.
Clearfield, A., et al. "Cesium and Strontium Specific Exchangers for Nuclear Waste Effluent Remediation" Final Report of DOE Project No. DE-FG07-96 ER 14689, Sep. 2000, pp. 1-20.
International Search Report (Form PCT/ISA/210) of PCT/US2014/010444.
Hobbs, D. (2011). Properties and uses of sodium titanates and peroxotitanates. Journal of the South Carolina Academy of Science, 9(1), 8. Received Dec. 10, 2010. Behrens EA, Clearfield A. Titanium silicates, M 3 HTi 4 O 4 (SiO 4) 3-4H 2 O (M=Na+, K+), with three-dimensional tunnel structures for the selective removal of strontium and cesium from wastewater solutions. Microporous Materials. Aug. 31, 1997;11(1):65-75.
Supplementary European Search Report mailed on on Sep. 2, 2016 for European Application No. 14738180.0, 9 pages.
Kuznicki et al., "Synthesis and Adsorptive Properties of Titanium Silicate Molecular Sieves," Synthesis of Microporous Materials—Molecular Sieves, vol. 1, 1992, pp. 427-432.
Kostov-Kytin et al., "Atomic arrangements in amorphous sodium titanosilicate precursor powders," Microporous and Mesoporous Materials, 86(1-3), Nov. 2005, pp. 223-230.

(Continued)

*Primary Examiner* — Matthew O Savage
(74) *Attorney, Agent, or Firm* — Lowenstein Sandler LLP

(57) ABSTRACT

This invention is directed to amorphous and crystalline titanosilicate materials that have an unexpected selectivity for cesium and strontium, especially in the presence of high levels of competing ions. The titanosilicates of this invention show very high, unexpected selectivity in the presence of such competing cations such as sodium, calcium, magnesium and potassium, such as present in seawater.

19 Claims, No Drawings

(56) References Cited

OTHER PUBLICATIONS

Breck, "Zeolite Molecular Sieves," Robert E. Krieger Publishing Company, 1984, pp. 249-251.

* cited by examiner

METHOD OF REMOVING STRONTIUM CATIONS FROM A WATER STREAM USING AN AMORPHOUS TITANIUM SILICATE

FIELD OF THE INVENTION

This invention relates to a novel ion exchange media capable of removing radionuclides from water, including seawater.

BACKGROUND OF THE INVENTION

The use of ion exchangers, both organic and inorganic, including crystalline molecular sieve zeolites, in order to remove certain metals from aqueous solutions is notoriously old in the art and the patent and technical literature contains many examples of such techniques. Although molecular sieves generally are effective for the removal of certain cations, nevertheless, when competing cations are present in the aqueous solution, a molecular sieve will function normally to the point at which the metal which is desirous of being removed effectively occupies some portion of the ionic sites in said zeolite. Thereafter, the zeolite must either be discarded or regenerated.

A very practical use for the above type of operation is in the home water softening industry wherein an ion exchanger of the organic or inorganic type is contacted with water until the calcium and magnesium ions which are inherently present in most mineral water replaces the ion originally associated with the ion exchanger, usually sodium. At this point, the ion exchanger has to be regenerated and this is usually accomplished by back-washing, or back-flushing, or otherwise contacting the ion exchanger with a solution of a different cation than that which was removed from the water, i.e., usually sodium in the form of sodium chloride. The sodium exchanges for the calcium/magnesium in the spent ion exchanger and the cycle is ready to start anew.

In evaluating the properties of a suitable ion exchanger, it is quite obvious that the environment in which it works to remove the unwanted metal or metals is of extreme importance and its susceptibility to competing ions is of paramount importance in obtaining a practical exchanger as opposed to one that is merely a scientific curiosity.

Thus, for example, in industrial processes wherein heavy metals are present in contaminated aqueous solutions, such heavy metals are not ordinarily present by themselves because the water contains other ions, particularly calcium and magnesium. Thus for an ion exchanger to be practical in the contact of industrial waste streams containing heavy metals, it is necessary that the ion exchanger be sufficiently selective towards heavy metals versus magnesium or calcium which compete for its ion exchange sites.

U.S. Pat. No. 5,053,139 discloses that certain amorphous titanium and tin silicate gels demonstrate remarkable rates of uptake for heavy metal species such as lead, cadmium, zinc, chromium and mercury which are an order of magnitude greater than that of prior art absorbents or ion exchangers under the conditions tested which include the presence of competing ions such as calcium and magnesium. The combination of extraordinary lead selectivities, capacity and uptake rates, allows such materials to strip lead from aqueous streams with minimal contact time allowing direct end use in filters for water purification, be it under-the-counter or under-the-faucet, or whole-house devices. While this patent teaches a process for the removal of heavy metals from aqueous solutions containing competing ions such as calcium and/or magnesium using an amorphous titanium or tin silicate, no information is provided for the selective removal of Group I or II ions, such as cesium or strontium from aqueous streams containing competing ions.

Throughout the nuclear industry, many aqueous streams exist containing radioactive ions such as strontium and cesium which must be removed prior to disposal of the liquid. Ion exchange is an ideal methodology to remove such ions. However, these streams generally contain non-radioactive competing cations that render most ion exchange materials ineffective due to limited selectivity. There are many different streams containing various levels of different competing ions. For example, the Fukushima, Japan site is known to have large quantities of water containing radioactive strontium and cesium, complicated by contamination with substantial levels of seawater due to the tsunami of 2011. Removing the radionuclides in this competing ion environment has been challenging.

Another example of high competing ions is found in high level nuclear waste solutions. These solutions, proposed materials and test methods are reviewed by Hobbs, D. T., et al in "Strontium and Actinide Separations from High Level Nuclear Waste Solutions Using Monosodium Titanate 1. Simulant Testing", Separation Science and Technology, 40: 3093-3111, 2005. Hobbs discloses that monosodium titanate (MST), $NaTi_2O_5 \cdot xH_2O$, an amorphous white solid, exhibits high selectivity for many metallic ions in both acidic and alkaline waste solutions including those containing strontium and several actinides. To those skilled in the art, it is well know that very expensive and specialized mono sodium titanates (MST) and crystalline silicotitanates (CST) are employed for the purification of these streams.

SUMMARY OF THE INVENTION

This invention is directed to amorphous and crystalline titanosilicate materials that have an unexpected selectivity for cesium and strontium, especially in the presence of high levels of competing ions. The titanosilicates of this invention show very high, unexpected selectivity in the presence of such competing cations such as sodium, calcium, magnesium and potassium, such as present in seawater.

The titanosilicates of this invention offer what is expected to be a more cost effective alternative at comparable performance to the specialized MST media noted above. Further, the amorphous titanosilicates of this invention can be produced in agglomerated form without the need for a binder, thus providing a significant advantage over MST and CST materials that are produced in powder form and must be bound, for example according to the teachings of Hobbs, D. T. Journal of the South Carolina Academy of Science, [2011], 9(1) "Properties and Uses of Sodium Titanates and Peroxotitanates". A further advantage of the proposed invention is that such inorganic materials can be vitrified making them suitable for long-term burial of radioactive nuclear waste. Organic ion exchange resins, for example, do not offer these benefits. Also, the high titanium content of MST makes those materials more difficult to vitrify relative to the subject of this invention.

DETAILED DESCRIPTION OF THE INVENTION

It has now been found that certain amorphous and crystalline titanium silicates are admirably suited to remove radionuclides from water in the presence of competing ions normally found in seawater. More specifically, di- and tri-valent radionuclides are capable of being removed from contaminated aqueous streams, such as seawater, surface water and ground water which contain non-radio-active Groups I and II cations. Removal of cesium and strontium in the presence of competing ions by titanium silicates is readily achieved.

Although silicate gels have long been known in the art to be useful for a wide variety of applications including ion exchangers, and recognition that certain silicate gels were so unusual that they could also effectively remove lead at an extremely high rate, as disclosed in U.S. Pat. No. 5,053,139, the use of titanium silicates for the removal of radionuclides such as cesium and strontium from seawater has not been recognized.

The amorphous titanium silicates useful in the novel process of this invention are titanium silicates, which preferably contain a silicon-to-titanium ratio of from 2:1 to 0.5:1, with silicon-to-titanium ratios of 1.5:1 to 1.2:1 being most preferred.

The titanium silicates useful in the novel process of this invention are prepared by merely contacting a solution of a soluble titanium salt, such as the chloride, the bromide, the oxychloride, etc. with a sodium silicate solution and sufficient alkali with vigorous stirring.

The pH of the solution should fall between 4 and 9, and preferably between 7 and 8, and if this is not the case, the pH is adjusted with dilute HCl or any other acid or dilute sodium hydroxide. The sample is then washed free of salts and dried. It is usually dried at about 70° C. for 24 to 48 hours, although the drying temperature and time are not critical.

Initially, the amorphous titanium silicates are formed as a precipitated gel. The gel can be used as made, which is usually in its sodium form, or in other alkali or alkaline earth metal forms, as well as in its hydrogen form. The gel is washed and then dried, the dried gel being stable in water. If the gel is dried by spray drying, then the material forms a powder. If the gel is tray dried, the material forms a rock-like state, which resembles dried mud with shrinkage cracks. The rock-like material is ground to make granules or stress fractured via hydrostatic pressure. The amorphous nature of these titanium silicates can be evidenced by a powder X-ray diffraction pattern with no crystalline character.

The present invention also includes stable crystalline titanium silicate molecular sieve zeolites which have a pore size of approximately 3-4 Angstrom units and a titania/silica mole ratio in the range of from 1.0 to 10. These materials are known as ETS-4 and are described in U.S. Pat. No. 4,938,939. The ETS-4 titanium silicates have a definite X-ray diffraction pattern unlike other molecular sieve zeolites and can be identified in terms of mole ratios of oxides as follows:

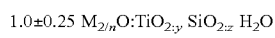

$$1.0 \pm 0.25 \, M_{2/n}O : TiO_{2:y} \, SiO_{2:z} \, H_2O$$

wherein M is at least one cation having a valence of n, y is from 1.0 to 10.0, and z is from 0 to 100. In a preferred embodiment, M is a mixture of alkali metal cations, particularly sodium and potassium, and y is at least 2.5 and ranges up to about 5.

Members of the ETS molecular sieve zeolites have an ordered crystalline structure and an X-ray powder diffraction pattern having the following significant lines:

TABLE 1

XRD POWDER PATTERN OF ETS-4
(0-40° 2 theta)

| SIGNIFICANT d-SPACING (ANGS.) | I/I$_o$ |
|---|---|
| 11.65 ± 0.25 | S-VS |
| 6.95 ± 0.25 | S-VS |
| 5.28 ± 15 | M-S |
| 4.45 ± 15 | W-M |
| 2.98 ± 05 | VS |

In the above table,
VS=50-100
S=30-70
M=15-50
W=5-30

ETS-4 molecular sieve zeolites can be prepared from a reaction mixture containing a titanium source such as titanium tetrachloride, a source of silica, a source of alkalinity such as an alkali metal hydroxide, water and, optionally, an alkali metal fluoride having a composition in terms of mole ratios falling within the following ranges.

TABLE 2

|  | Broad | Preferred | Most Preferred |
|---|---|---|---|
| SiO$_2$/Ti | 1-10 | 1-10 | 2-3 |
| H$_2$O/SiO$_2$ | 2-100 | 5-50 | 10-25 |
| Mn/SiO$_2$ | 0.1-10 | .5-5 | 1-3 | wherein M indicates the cations of valence n derived from the alkali metal hydroxide and potassium fluoride and/or alkali metal salts used for preparing the titanium silicate according to the invention. The reaction mixture is heated to a temperature of from about 100° C. to 300° C. for a period of time ranging from about 8 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 100° C. to 175° C. for a period of time ranging from 12 hours to 15 days. Crystallization is performed in a continuous or batchwise manner under autogeneous pressure in an autoclave or static bomb reactor. Following the water washing step, the crystalline ETS-4 is dried at temperatures of 100 to 400° F. for periods ranging up to 30 hours.

The ETS-4 material is synthesized as a powder, typically, as a slurry of distinct particles in the micron size range. To utilize this material in a packed bed requires agglomeration of the ETS-4 with a binder, as, for example, disclosed in U.S. Pat. No. 4,938,939.

For reasons which are not completely understood, it has been discovered that ion exchangers having extraordinary selectivity, capacity and rate of exchange can be prepared by precipitating hydrous metal oxides wherein the mole ratio of silicon to titanium is in the range from 1:4 to 1.9:1. Preferred mole ratios have been set forth above.

In general, the titanium silicates which are operable in the novel process of this invention have cumulative desorption pore volumes in cubic centimeters per gram ranging from about 0.03 to about 0.25. Cumulative desorption pore volume is determined by the method as described in U.S. Pat. No. 5,053,139.

Although titanium silicates are preferred, it is believed tin silicates would also be useful in removing radionuclides from aqueous streams containing competing ions. The tin silicate gels can be prepared as mentioned above by contacting a solution of a soluble tin salt, such as the chloride, bromide, oxychloride, etc. with a sodium silicate solution and sufficient alkali, and vigorous stirring.

The titanium silicates and tin silicates of this invention are capable of removing radionuclide cations from aqueous streams containing substantial amounts of competing cations. Thus, the invention is applicable for removing such cations from natural surface and ground water, such as for purification of potable water, as well as for remediation of natural water sources, which have become contaminated. In particular, the invention is capable of removing the radionuclide cation contamination from natural aqueous sources, which have become contaminated due to industrial waste runoff, or accidental leakage of such materials from industrial processing. A particularly contemporary use would be the removal of such radionuclide cations from industrial process streams, such as, for example, from fuel pool water of a nuclear reactor used to produce electricity, as well as from nuclear electrical generating plants which have been overrun by seawater, such as in the recent tsunami which afflicted Japan several years ago, or from other industrial process streams.

In general, the silicates of the present invention are capable of removing radionuclide cations including, but not limited to, cesium and strontium from aqueous systems, which contain at least 10 times the amount of cations other than the radionuclide cations on an equivalent basis. Such other cations would include Group I and Group II metal cations such as sodium, potassium, calcium and magnesium. The invention is also useful in removing the radionuclide cations from aqueous systems, in which the aqueous stream contains at least 100 times the amount of the light Group I and Group II metal cations and, even, when such aqueous streams contain at least 1,000 times and more of the competing Group I and Group II cations relative to the radionuclide cations on an equivalent basis.

EXAMPLE 1

Two liters of a 1.5 M titanium chloride solution (solution A) are made by adding 569.11 g $TiCl_4$ to enough deionized water to make 2 liters. Two liters of 1.5M sodium silicate solution (solution B) are made by dissolving 638.2 g of $Na_2SiO_3 \cdot 5H_2O$ in enough 3M NaOH to make 2 liters. Solution B is added to solution A at a rate of 16 cc/minute with extremely vigorous stirring. After addition is complete, the mixture is allowed to continue mixing for an additional 15 minutes. The pH of the solution should fall between 7.5 and 7.9; if this is not the case, the pH is adjusted with dilute HCl or dilute NaOH. The sample is then allowed to age one hour. After aging, any water on top of the gel is decanted off. The sample is then filtered, washed with 1 liter deionized water per liter of gel, reslurried in 4-6 liters of deionized water, filtered, and finally rewashed with 2 liters of water per liter of gel. The sample is then dried at 100° C. for 24-48 hours.

The gel produced from this method has a silicon-to-titanium ratio of approximately 1:1 and a surface area of approximately 295 m²/g. Once dried, the large gel particulates are crushed into small particulates predominantly in the range of 20-60 mesh. The particles are then subjected to ion exchange testing. The pore size distribution as measured by nitrogen desorption is found to have an average pore radius of 15 angstroms. The cumulative desorption pore volume of this sample is found to be 0.148 cc/g.

EXAMPLE 2

A solution using reagent grade chemicals in deionized distilled water was prepared as shown in Table 3, which provides a summary of a composition for a simulated high-level nuclear waste solution used to evaluate the titanium silicate of this invention. A targeted amount of 5.2 ppm of non-radioactive Sr was added to the solution shown in Table 3. 2.5 mg of titanosilicate formed in Example 1 was added to 25 ml of the simulated solution and allowed to equilibrate with agitation for 40 hours at ambient room temperature. After equilibration, the solution was filtered through a 0.45 micron pore size nylon membrane filter to remove any residual solids. Strontium levels were effectively reduced to the following concentrations in a series of six separate experiments as described in this example: 1.7 ppm, 1.5 ppm, 1.5 ppm, 1.4 ppm, 1.4 ppm, and 1.5 ppm.

TABLE 3

Chemical composition of simulated waste solutions

| Component | Concentration (M) |
|---|---|
| NaOH | 1.33 |
| $NaNO_3$ | 2.66 |
| $NaNO_2$ | 0.134 |
| $NaAl(OH)_4$ | 0.429 |
| $Na_2CO_3$ | 0.0260 |
| $Na_2SO_4$ | 0.521 |
| Total Na | 5.6 |
| Ionic strength | 6.1 |

EXAMPLE 3

Five gallons of an artificial solution representing a concentration of 30% ordinary seawater was prepared by diluting the ingredients in Table 4:

TABLE 4

| Component | Mass, g |
|---|---|
| NaCl | 136.27 |
| MgCl2•6H2O | 61.92 |
| Na2SO4 | 22.71 |
| CaCl2•6H2O | 11.32 |
| KCl | 3.97 |
| KBr | 0.57 |
| SrCl2•6H2O | 0.262 |

Clinoptilolite and zeolite 4A are common zeolites with known selectivity for heavy cations and were thus compared to the titanosilicate of Example 1. Twenty grams of the 30% seawater solution was added to each of three 250 ml Ehrlenmeyer flasks. To each solution two grams of each ion exchange sample was added. A second set of three flasks were prepared using fifty grams of solution and 0.5 g of each media and a third set using 200 grams of solution and 0.2 grams of each media. The nine samples thus were dosed according to the ratios shown in Table 5. The flasks were manually agitated several times per day and allowed to equilibrate for 4210 minutes. Aliquots of each end-of-run solution were withdrawn through a syringe fitted with a micron size filter and analyzed for the cations present in the starting solution. The results are included in Table 5 and clearly show the superior strontium removal performance of the titanosilicate.

TABLE 5

| Media | wt ratio media: solution | Na, ppm | Mg, ppm | Ca, ppm | K, ppm | Sr, ppm |
|---|---|---|---|---|---|---|
| Starting Solution | — | 3181 | 387 | 108 | 118 | 4.8 |
| Titanosilicate | 1:10 | 4910 | 128 | 2 | 5 | 0.012 |
| Zeolite 4A | 1:10 | 4500 | 1 | <1 | 11 | 0.052 |
| Clinoptilolite | 1:10 | 2790 | 364 | 419 | 99 | 6 |
| Titanosilicate | 1:100 | 3530 | 342 | 44 | 52 | 0.335 |
| Zeolite 4A | 1:100 | 3740 | 192 | 27 | 42 | 0.589 |
| Clinoptilolite | 1:100 | 3130 | 368 | 141 | 110 | 5 |
| Titanosilicate | 1:1000 | 3260 | 377 | 99 | 112 | 3 |
| Zeolite 4A | 1:1000 | 3080 | 379 | 98 | 111 | 4 |
| Clinoptilolite | 1:1000 | 3200 | 364 | 107 | 120 | 5 |

EXAMPLE 4

In commercial practice, ion exchange materials are largely employed in dynamic flow systems owing to the improved performance and practicality. These systems require water stable agglomerates to ensure the dynamic pressure drop is acceptable. In such systems the treated effluent stream changes composition over time representing the various mass transfer fronts moving through the bed. The lowest selectivity ion emerges from the bed first, followed successively by those with incrementally higher selectivity. The stock seawater solution from Example 3 was further diluted with deionized water at a ratio of 11:1 [water:stock]. Ten grams of the titanosilicate of Example 1 was placed in a glass column with an internal diameter of 11 mm and packed with inert glass wool on both sides of the bed. The diluted stock solution was flowed through the column at an average rate of 1.74 ml/min. The outlet stream was monitored at various times and analyzed for the ions in the stock solution. The results in Table 6 clearly show the selectivity for strontium is several orders of magnitude greater than the competing ions of sodium, magnesium, calcium and potassium.

TABLE 6

| Elapsed time, hh:mm | Na, ppm | Mg, ppm | Ca, ppm | K, ppm | Sr, ppb |
|---|---|---|---|---|---|
| 1:05 | 347 | <1 | <1 | <1 | 0.25 |
| 18:15 | 320 | 14 | <1 | <1 | 0.13 |
| 43:05 | 284 | 33 | <1 | <1 | 0.08 |
| 66:20 | 272 | 37 | <1 | <1 | 0.12 |
| 89:55 | 271 | 37 | 2 | 3 | 0.19 |
| 114:25 | 268 | 34 | 3 | 6 | 0.43 |
| 138:05 | 268 | 35 | 5 | 8 | 1.44 |
| 185:55 | 264 | 33 | 7 | 10 | 2.94 |
| 210:05 | 265 | 33 | 7 | 10 | 13.3 |
| 236:35 | 272 | 33 | 7 | 10 | 20.2 |
| 288:55 | 272 | 31 | 8 | 11 | 33.9 |
| 305:55 | 269 | 33 | 8 | 11 | 34.7 |
| 330:15 | 271 | 32 | 8 | 10 | 44.0 |
| 354:40 | 258 | 33 | 9 | 11 | 38.8 |
| 377:55 | 255 | 32 | 9 | 10 | 42.4 |
| 402:10 | 252 | 33 | 9 | 10 | 48.4 |
| 431:35 | 254 | 31 | 9 | 11 | 53.8 |
| 456:10 | 257 | 33 | 9 | 11 | 56.8 |
| 474:20 | 250 | 33 | 9 | 10 | 66.8 |

EXAMPLE 5

To further show the advantages of the present invention relative to current technology, the experiment of Example 4 was repeated using a standard granular zeolite type 4A supplied by BASF under the designation 4A BF. The results of the dynamic breakthrough test are shown in Table 7. The emergence of strontium in the effluent (also referred to as breakthrough) is nearly immediate and much sooner than in Example 4 despite this zeolite having more than twice the ion exchange capacity than the titanosilicate.

TABLE 7

| Elapsed Time, hh:mm | Na, ppm | Mg, ppm | Ca, ppm | K, ppm | Sr, ppb |
|---|---|---|---|---|---|
| 0:30 | 518 | <1 | <1 | 1 | 5 |
| 21:45 | 320 | 21 | 4 | 4 | 91 |
| 51:30 | 310 | 26 | 6 | 6 | 172 |
| 70:30 | 308 | 27 | 6 | 7 | 194 |
| 117:35 | 304 | 28 | 7 | 8 | 234 |

The invention claimed is:

1. A method comprising:
   contacting a water stream with an amorphous titanium silicate, the water stream containing strontium cations and at least one of sodium cations, potassium cations, calcium cations, or magnesium cations, the amorphous titanium silicate being prepared by contacting a solution of soluble titanium salt with a sodium silicate solution and alkali with stirring, the amorphous titanium silicate being precipitated as a gel and formed into powder or granules without crystalline character prior to the contacting; and
   selectively removing a portion of the strontium cations from the water stream by ion exchanging sodium ions on the amorphous titanium silicate for the strontium cations in the water stream in response to the contacting of the water stream with the amorphous titanium silicate.

2. The method of claim 1, wherein the titanium silicate has a silicon to titanium (Si:Ti) ratio of from about 2:1 to about 0.5:1.

3. The method of claim 2, wherein the Si:Ti ratio is from about 1.5:1 to about 0.9:1.

4. The method of claim 1, wherein the amorphous titanium silicate is present as binder-free granules.

5. The method of claim 1, wherein said water stream comprises seawater.

6. The method of claim 1, wherein said water stream comprises surface or ground water.

7. The method of claim 6, wherein said water stream is purified to produce potable water, or for remediation of water streams which have been contaminated with the strontium cations.

8. The method of claim 1, wherein said water stream is from nuclear fuel pool water, or from a seawater flooded nuclear power plant for generating electricity.

9. The method of claim 1, wherein the water stream contains at least 10 times the amount of the at least one of the sodium cations, the potassium cations, the calcium cations, or the magnesium cations relative to the strontium cations on an equivalent mass per unit volume basis.

10. The method of claim 9, wherein said water stream comprises seawater.

11. The method of claim 1, wherein the water stream contains at least 100 times the amount of the at least one of the sodium cations, the potassium cations, the calcium cations, or the magnesium cations relative to the strontium cations on an equivalent mass per unit volume basis.

12. The method of claim 1, wherein the water stream contains at least 1,000 times the amount of the at least one of the sodium cations, the potassium cations, the calcium cations, or the magnesium cations relative to the strontium cations on an equivalent mass per unit volume basis.

13. The method of claim 1, wherein the sodium silicate solution is formed by dissolving sodium metasilicate pentahydrate ($Na_2SiO_3*500\ 5H_2O$) in sodium hydroxide (NaOH).

14. The method of claim 1, wherein the solution of the soluble titanium salt is formed by adding titanium tetrachloride ($TiCl_4$) to deionized water.

15. The method of claim 1, wherein the powder or the granules of the amorphous titanium silicate has a particle-size distribution of about 20 to 60 mesh.

16. The method of claim 1, wherein said water stream includes a concentration of sodium cations of about 3181 ppm, a concentration of magnesium cations of about 387 ppm, a concentration of calcium cations of about 108 ppm, a concentration of potassium cations of about 118 ppm, and a concentration of strontium cations of about 4.8 ppm.

17. The method of claim 16, wherein said step of contacting includes contacting about 1 part by weight of the amorphous titanium silicate to about 10 parts by weight of the water stream, and wherein the step of removing reduces the concentration of strontium ions from about 4.8 ppm to about 0.012 ppm.

18. The method of claim 16, wherein said step of contacting includes contacting about 1 part by weight of the amorphous titanium silicate to about 100 parts by weight of the water stream, and wherein the step of removing reduces the concentration of strontium ions from about 4.8 ppm to about 0.335 ppm.

19. The method of claim 16, wherein said step of contacting includes contacting about 1 part by weight of the amorphous titanium silicate to about 1000 parts by weight of the water stream, and wherein the step of removing reduces the concentration of strontium ions from about 4.8 ppm to about 3 ppm.

* * * * *